Patented Sept. 13, 1938

2,129,732

UNITED STATES PATENT OFFICE 2,129,732

PRODUCTION OF LIQUID HYDROCARBONS FROM GASEOUS OLEFINES

Stewart C. Fulton and Thomas Cross, Jr., Elizabeth, N. J., assignors to Standard Oil Development Company, a corporation of Delaware No Drawing. Application October 7, 1936, Serial No. 104,438

7 Claims. (Cl. 196—10)

The present invention relates to the polymerization of normally gaseous olefines into materials of higher molecular weight, particularly to hydrocarbons boiling within the gasoline range. More specifically, the present invention is directed to the catalysis of such polymerizations.

According to the present invention, normally gaseous olefines, such as ethylene, propylene and butylene, are polymerized at temperatures ranging between 200° C. and 400° C. under atmospheric or superatmospheric pressure by the action of catalysts prepared by impregnating an acid gel of an oxide of an element of Group IV of the periodic system with a compound of a different element of Group IV of the periodic system, the oxide of which is normally solid, together with, if desired, a compound of a metal of Group II of the periodic system. Due to the method employed for the preparation of these catalysts, it is assumed that the said compound of the fourth group element is an oxide.

These catalysts are customarily prepared by precipitating the hydrate of the element which is to be employed as the gel, mixing the hydrate with a water solution of a salt of the element whose compound is to be precipitated on the gel, subjecting the mixture to a long digestion period at a temperature of about 100° C. during which period the gel structure forms by the chemical combination of water of hydration with the gel-forming hydrate, and then drying the mixture at a somewhat higher temperature not sufficiently high to destroy the gel structure. For example, silica gel is precipitated from a dilute waterglass solution by the addition of dilute HCl, and the gel so produced is mixed with a solution of a salt of zirconium and the mixture placed on a steam bath for several hours. The mixture is then filtered and carefully washed until free of acid reaction and dried carefully at 220° C. The amount of metal compound deposited on the gel usually does not exceed about 5% by weight, and is usually of the order of 1% by weight.

As specific examples of mixed catalysts contemplated for use according to the present invention are zirconia on silica gel, thoria on silica gel, titania on silica gel, germania on silica gel, zirconia on titania gel, thoria on titania gel, tin oxide on titania gel, titania on zirconia gel, and thoria on zirconia gel. Of these, the preferred catalysts are those made by depositing compounds of the metals occurring in the left hand column of Group IV of the periodic chart as compiled by Henry D. Hubbard of the U. S. Bureau of Standards, on silica gel, and particularly zirconia on silica gel. Catalysts prepared by depositing tin oxide or lead oxide on silica gel are much less effective but do exhibit some utility.

Among the hydrocarbons which may be treated according to the present invention are pure olefins, such as propylene and butylene derived by dehydration of the corresponding alcohols, natural occurring gases containing $C_2$, $C_3$ and $C_4$ olefins, the concentration of which may be increased by catalytic dehydrogenation or cracking, and refinery gases containing $C_2$, $C_3$ and $C_4$ olefines. Where the initial material is a mixed gas, such as refinery or natural gas, it is desirable to subject the gas to fractionation so as to concentrate $C_3$ and $C_4$ hydrocarbons and increase conversion per pass. Satisfactory conversions are obtainable at atmospheric pressure. Higher conversions are obtainable at elevated pressures, such as pressures in excess of 100 lbs./sq. in. and preferably of the order of 200–500 lbs./sq. in. Increased pressure makes it possible to operate at lower temperatures within the range indicated.

These catalysts suffer a loss of activity with extended use, but may be reactivated in situ by including in the feed a very small percentage of a hydrogen or alkyl halide, such as methyl, ethyl, isopropyl, butyl or similar chloride. The percentage of the activating agent added may, in general, vary from 0.2% to 2 or 3% of the feed. In some cases activity of the catalyst may be sustained by adding a small per cent of steam to the feed. The purpose of the steam is to make up for any loss of chemically bound water in the silica gel, it having been found that a loss of water of hydration in the silica gel reduces the activity of the catalysts.

The apparatus employed for carrying out the process of the present invention is simple in construction, consisting merely of a reaction tube preferably composed of a material such as quartz, silica or "Nichrome" steel, which does not catalyze the decomposition of hydrocarbons to carbon and hydrogen, and packed with the catalyst which is in granular or molded pill form. The reaction tube may be heated in a conventional manner, such as by electrical resistance. For insurance of constant temperature, the tube may be imbedded in a heated metal block or in a molten metal or other liquid heating medium. The amount of heat which must be supplied to the reaction chamber is usually not very great since the reaction is exothermic. When the olefin concentration of the feed stock is very high, it may be necessary at times to withdraw heat from the reaction chamber so as to maintain the desired temperature. When the feed stock is obtained by dehydration of alcohols over a dehydration catalyst, such as bauxite, at about 400° C., the polymerization tube may be connected in series with the dehydration chamber so that the heat contained in the gases leaving the dehydration chamber can be utilized.

The process of the present invention will be better understood from the following specific examples which demonstrate the catalytic effect of typical mixtures of the group previously enumerated. In these examples, the value given for catalytic activity designates the grams of polymer formed per gram of catalyst per hour.

Example 1

A catalyst was prepared by peptizing 10 grams of hydrated $ZrO_2$ in boiling 5N.HCl, adding one-half of this solution to 200 grams of moist silica gel prepared in the usual way, and digesting the mixture in a steam bath for several hours. The mixture was then carefully washed and filtered until free of chloride radicals, and was dried in the course of several hours at 220° C.

Refinery $C_4$ cut composed mainly of $C_4$ hydrocarbons and containing about 35% of butylenes was passed over 27 grams of this catalyst at the rate of about 0.75 cu. ft./hr. and at an average temperature of about 250° C. During the first hour of operation the average catalytic activity was about .28, having been .36 at the end of the first half hour, .31 at the end of 45 minutes and .18 at the end of the first hour. Thereafter the catalytic activity dropped gradually until at the end of 2 hours it was .06. The catalyst at this point was a dark grey in color.

Example 2

The above run was repeated with the exception that the feed gas, in being passed to the catalyst, was passed thru water at 25° C. In the first measurement of catalytic activity this run was .35, and at the end of 3½ hours it was still .10. The water vapor was then omitted and the catalyst showed a temporary rise in activity to .11 but shortly dropped to .08. After the run had progressed 5 hours and the catalytic activity was .08, two doses of 2 cc. of secondary butyl chloride were introduced with the feed. At the end of 5½ hours the catalytic activity was .28 and at the end of 5¾ hours it was .35, after which it dropped to about .30. Examination at the end of the run showed that the catalyst did not possess the dark grey color imparted to it by the first run.

Example 3

5 cu. ft. of propylene obtained by the dehydrogenation of isopropyl alcohol over bauxite at a temperature between 350 and 460° C. were passed over 83.5 grams of the catalyst described in Example 1 at an average temperature of 250° C. in the course of 4¾ hours. 74.5 grams of polymer were produced indicating an average catalytic activity over the whole run of about .19.

Example 4

A catalyst was prepared by treating silica gel obtained by mixing 250 cc. of $Na_1SiO_3$ (40° Bé.) with 2N.HCl, washing the gel free of chlorides, mixing a dilute HCl solution of 5 grams of $ZrO_2$ and 5 grams of ZnO with the gel, digesting the mixture on a steam bath for 3 hours, filtering it and washing it free of chlorides and drying it at 220° C.

6.5 cu. ft. of butylene obtained by the dehydration of secondary butyl alcohol over bauxite at a temperature of about 400° C. were passed in the course of 6¼ hours over 70 grams of this catalyst. 70 grams of liquid polymer were produced, indicating an average catalytic activity of .19.

All of the above runs were conducted at atmospheric pressure. By increasing the pressure to about 200 lbs./sq. in., increased yields and corresponding increased catalytic activities of the order of about 40% may be obtained. At pressures above 200 lbs./sq. in. somewhat lower temperatures should be employed.

Whether or not the catalyst is effective in this reaction can be demonstrated qualitatively by arranging the catalyst in the reaction zone and causing the effluent gases to pass thru a receiver cooled sufficiently to condense gasoline polymers. Accordingly, it was not necessary to conduct quantitative experiments with all of the specific catalysts mentioned. It may be stated, however, that present indications are that a catalyst for which a preference has previously been stated is the most effective of the specific catalysts enumerated.

In practical operation, recycling of the unconverted feed stock after separation of the polymer formed is advisable. This process may be advantageously combined with a catalytic dehydrogenation of gaseous paraffins as well as with the dehydration of the corresponding alcohols. When dehydrogenation of gaseous paraffins is the first step, the unconverted feed leaving the polymerization chamber may be recycled directly to the dehydrogenation unit if its content of olefines is substantially consumed, or it may be sent directly to a thermal polymerization unit operated under conditions suitable for the conversion of gaseous paraffins to liquid products, that is, at a temperature in excess of about 900° F. and under a pressure of at least 500 lbs./sq. in., usually about 1000 to 2000 lbs./sq. in.

The nature and objects of the present invention having been thus described and illustrated by preferred embodiments of the same, what is claimed as new and useful and desired to be secured by Letters Patent is:

1. A process for the conversion of normally gaseous olefines to higher boiling polymers, which comprises contacting said olefines at a temperature between about 200° and 400° C. with a catalyst, the initial catalytic constituents of which are zirconia and zinc oxide on silica gel.

2. A process according to claim 1 in which, during the progress of the reaction, the activity of the catalyst is maintained by adding to the hydrocarbon feed stock a small amount of a substance selected from the group consisting of hydrogen halides and alkyl halides.

3. A process for the conversion of normally gaseous olefines to higher boiling polymers which comprises contacting said olefines at a temperature between about 200° and 400° C. with a catalyst, the initial catalytic constituents of which are from 1% to 5% of zirconia and zinc oxide on silica gel.

4. A process for the conversion of normally gaseous olefines to higher boiling polymers which comprises contacting said olefines at a temperature between about 200° and 400° C. with a catalyst, the initial catalytic constituents of which are about 1% of zirconia and zinc oxide on silica gel.

5. A process for the conversion of normally gaseous olefines to higher boiling polymers which comprises contacting said olefines at a temperature between about 200° and 400° C. and under superatmospheric pressure with a catalyst, the initial catalytic constituents of which are zirconia and zinc oxide on silica gel.

6. A process for the conversion of normally gaseous olefines to higher boiling polymers according to claim 5 in which the superatmospheric pressure is over 100 pounds per square inch.

7. A process for the conversion of normally gaseous olefines to higher boiling polymers according to claim 5 in which the superatmospheric pressure is between 250 and 500 pounds per square inch.

STEWART C. FULTON.
THOMAS CROSS, JR.